United States Patent
Holscher

(10) Patent No.: US 8,597,564 B2
(45) Date of Patent: Dec. 3, 2013

(54) METHOD FOR PRODUCING CONCRETE PREFINISHED PARTS

(75) Inventor: Norbert Holscher, Aurich (DE)

(73) Assignee: Aloys Wobben, Aurich (DE)

(*) Notice: Subject to any disclaimer, the term of this patent is extended or adjusted under 35 U.S.C. 154(b) by 163 days.

(21) Appl. No.: 12/936,171

(22) PCT Filed: Apr. 1, 2009

(86) PCT No.: PCT/EP2009/002374
§ 371 (c)(1),
(2), (4) Date: Dec. 6, 2010

(87) PCT Pub. No.: WO2009/121581
PCT Pub. Date: Oct. 8, 2009

(65) Prior Publication Data
US 2011/0107708 A1    May 12, 2011

(30) Foreign Application Priority Data
Apr. 1, 2008    (DE) .................. 10 2008 016 828

(51) Int. Cl.
*B28B 1/16*    (2006.01)
*B28B 11/08*    (2006.01)

(52) U.S. Cl.
USPC ...................................................... 264/333

(58) Field of Classification Search
USPC ...................................................... 264/333
See application file for complete search history.

(56) References Cited

U.S. PATENT DOCUMENTS

| | | | |
|---|---|---|---|
| 1,567,301 A | 12/1925 | Ross | |
| 1,723,216 A | 8/1929 | Stam | |
| 2,064,791 A | 12/1936 | Faber | |
| 2,130,911 A * | 9/1938 | Teunon | .................... 52/315 |
| 2,413,268 A | 12/1946 | Unverferth | |
| 2,756,479 A | 7/1956 | Garneau | |
| 2,826,800 A | 3/1958 | Van Buren | |
| 3,180,570 A | 4/1965 | Grabowski | |
| 3,504,500 A | 4/1970 | Fristedt | |
| 3,606,666 A | 9/1971 | Briggs, Jr. | |
| 3,666,606 A | 5/1972 | Stokes | |
| 3,721,056 A | 3/1973 | Toan | |
| 3,967,421 A | 7/1976 | Dufossez | |
| 3,977,137 A | 8/1976 | Patry | |
| 4,272,929 A | 6/1981 | Hanson | |
| 4,333,660 A | 6/1982 | Cupit | |

(Continued)

FOREIGN PATENT DOCUMENTS

| DE | 1038743 | 9/1958 |
|---|---|---|
| DE | 6905988 U | 7/1969 |

(Continued)

*Primary Examiner* — Christina Johnson
*Assistant Examiner* — Patrick Butler
(74) *Attorney, Agent, or Firm* — Seed IP Law Group PLLC

(57) ABSTRACT

There is provided a process for producing precast concrete parts, in particular pylon segments. Concrete is poured into a casting mold with a planar bottom for producing a planar underside. After the concrete has reached at least a minimum strength an equalization layer is applied to a join surface of the precast concrete part that is opposite to the underside. As soon as the equalization layer has reached the minimum strength, the precast concrete part is placed on a horizontally oriented surface and the equalization layer on the top side is removed in a plane-parallel relationship with the underside.

4 Claims, 4 Drawing Sheets

(56) References Cited

U.S. PATENT DOCUMENTS

| | | |
|---|---|---|
| 4,386,172 A | 5/1983 | Yoshioka et al. |
| 4,890,420 A * | 1/1990 | Azimi .................. 451/273 |
| 5,029,879 A | 7/1991 | Strang, Sr. et al. |
| 5,176,408 A | 1/1993 | Pedersen |
| 5,555,697 A | 9/1996 | Kim |
| 5,666,774 A | 9/1997 | Commins |
| 5,771,518 A | 6/1998 | Roberts |
| 5,860,256 A | 1/1999 | Humber |
| 5,934,035 A | 8/1999 | Rasmussen et al. |
| 5,944,323 A | 8/1999 | Cavka |
| 6,185,885 B1 | 2/2001 | Thaler |
| 6,381,912 B1 | 5/2002 | Sorkin |
| 6,389,764 B1 | 5/2002 | Stubler et al. |
| 7,114,295 B2 | 10/2006 | Wobben |
| 7,752,825 B2 | 7/2010 | Wobben |
| 2006/0254168 A1 | 11/2006 | Wobben |
| 2011/0107708 A1 | 5/2011 | Holscher |

FOREIGN PATENT DOCUMENTS

| | | | |
|---|---|---|---|
| DE | 4216367 A1 | 11/1993 | |
| DE | 29809541 U1 | 11/1999 | |
| DE | 19823650 A1 | 12/1999 | |
| DE | 19841047 C1 | 1/2000 | |
| DE | 10133607 A1 | 8/2002 | |
| DE | 10349155 A1 * | 5/2005 | ............. B28B 11/08 |
| DE | 202010000169 U1 | 6/2010 | |
| FR | 1249458 | 11/1959 | |
| FR | 2775492 A1 | 9/1999 | |
| FR | 2783266 A1 | 3/2000 | |
| GB | 1349292 | 4/1974 | |
| JP | 50133652 A | 10/1975 | |
| JP | 6015518 A | 2/1985 | |
| JP | 1147005 A | 10/1989 | |
| JP | 4118266 A | 10/1992 | |
| JP | 5346052 A | 12/1993 | |
| JP | 6101348 A | 4/1994 | |
| JP | 634014 A | 5/1994 | |
| JP | 08-323729 A | 12/1996 | |
| JP | 10205428 A | 8/1998 | |
| JP | 11029911 A | 2/1999 | |
| JP | 11172964 A | 6/1999 | |
| JP | 2000-283019 A | 10/2000 | |
| JP | 2001062814 A | 3/2001 | |
| JP | 200341897 A | 2/2003 | |
| JP | 2003245848 A | 9/2003 | |
| JP | 2005-030066 A | 2/2005 | |
| JP | 2007321710 A | 12/2007 | |
| WO | 8602689 A1 | 5/1986 | |
| WO | 9943910 A1 | 9/1999 | |
| WO | 0204766 A2 | 1/2002 | |
| WO | 2004007955 A1 | 1/2004 | |
| WO | 2009121581 A2 | 10/2009 | |

* cited by examiner

METHOD FOR PRODUCING CONCRETE PREFINISHED PARTS

BACKGROUND

1. Technical Field

The present disclosure concerns a process for producing precast concrete parts, a precast concrete part and a wind power installation.

2. Description of the Related Art

When constructing high towers or pylons based on prefabricated segment parts or precast concrete parts, it can happen, because of production tolerances, that precast concrete parts which have to be placed one upon the other do not fit together in the optimum fashion.

To avoid that problem typically an equalization layer, for example mortar, is applied on the building site to a join surface or a flange of a precast concrete part, in which case that equalization layer must then harden on the building site, that is to say it must attain a minimum strength. That requires, inter alia, compliance with minimum meteorological demands which are dependent on the material of the equalization layer. If those minimum demands are not met or if the equalization layer is incorrectly applied then there is the risk of flaws or inadequate setting and so forth.

DE 101 33 607 A1 describes a process for the production of a precise precast concrete part.

BRIEF SUMMARY

In accordance with one aspect of the present disclosure a process is provided for producing precast concrete parts, which permits easier and faster erection of a pylon or tower from the precast concrete parts, with a quality that remains consistently high.

In accordance with another aspect of the present disclosure, a process for producing precast concrete parts in pylon segments is provided. The process includes casting concrete into a casting mold that has a planar floor for producing a planar underside; hardening the concrete to obtain a precast concrete part having a minimum strength; applying an equalization layer to a join surface that is opposite to the planar underside of the precast concrete part; placing the precast concrete part on a horizontal plane; and removing the equalization layer so that the join surface is in a plane-parallel relationship to the planar underside of the precast concrete part. In accordance with another aspect of the present disclosure, a process for producing precast concrete parts is provided. Concrete is cast in a casting mold with a planar floor to provide a planar underside. As soon as the concrete has reached a minimum strength and a precast concrete part of predetermined maximum strength is obtained an equalization layer is applied to a join surface of a hardened precast concrete part, that is opposite to the underside. The precast concrete part with its minimum strength is placed on a horizontal plane and the equalization layer is removed in plane-parallel relationship.

The prefabricated concrete parts can be pylon segments or parts of pylon segments.

In an aspect of the present disclosure, the equalization layer has synthetic resin.

In a further aspect of the present disclosure, removal of the equalization layer is effected by a milling unit having a displacement unit for displacement of the milling unit in the X-, Y- and Z-directions.

In a further aspect of the present disclosure a plurality of precast concrete parts which have hardened or which are of a minimum strength are arranged with an equalization layer on their respective join surface opposite to the underside on a horizontal plane and the equalization layers are machined in plane-parallel relationship by means of a milling unit.

The present disclosure also concerns a precast concrete part which has been produced as described hereinbefore. The present disclosure also concerns a pylon, in particular of a wind power installation, which has been erected with a plurality of the above-described precast concrete parts.

The present disclosure also concerns a wind power installation having an above-described pylon.

The present disclosure concerns the notion of providing precast concrete parts which are previously produced in a factory. In that case the precast concrete parts are produced in plane-parallel configuration in the factory. For that purpose the casting mold of the precast concrete part is arranged horizontally. In that situation the bottom of the casting mold is machined flat so that in the casting operation a flat underside is produced on the precast part, when for example concrete is introduced into the casting mold and remains in the mold until it has reached a minimum strength.

Then an equalization layer for example in the form of a synthetic resin is applied to the side of the precast concrete part that is opposite to the flat underside. As soon as the equalization layer has in turn reached a minimum strength the equalization layer is removed in a plane-parallel relationship so that the side of the precast concrete part that is opposite to the flat underside is in a plane-parallel relationship with the flat underside of the precast part. The precast concrete parts can then be transported to a building site.

As the precast concrete parts already leave the factory with plane-parallel join surfaces there is no need for post-treatment of the precast concrete parts on the building site. The precast concrete parts can thus be assembled to constitute a pylon without delay. In particular the step of applying an equalization material is omitted, and as a result, besides eliminating possible sources of error, the operating procedure on the building site is also accelerated and to a large extent made independent of the weather. The process according to the present disclosure provides a uniform quality for the precast concrete parts as complete production takes place in the factory under controlled conditions with quality assurance. In particular construction of the precast concrete parts to form a pylon can take place more quickly as there is no longer any need for any post-treatment operation or application of an equalization layer on the building site.

Further configurations of the present disclosure are subject-matter of the included claims.

BRIEF DESCRIPTION OF THE SEVERAL VIEWS OF THE DRAWINGS

Embodiments by way of example and advantages of the present disclosure are described more fully hereinafter with reference to the drawing.

DETAILED DESCRIPTION

Figure 1:
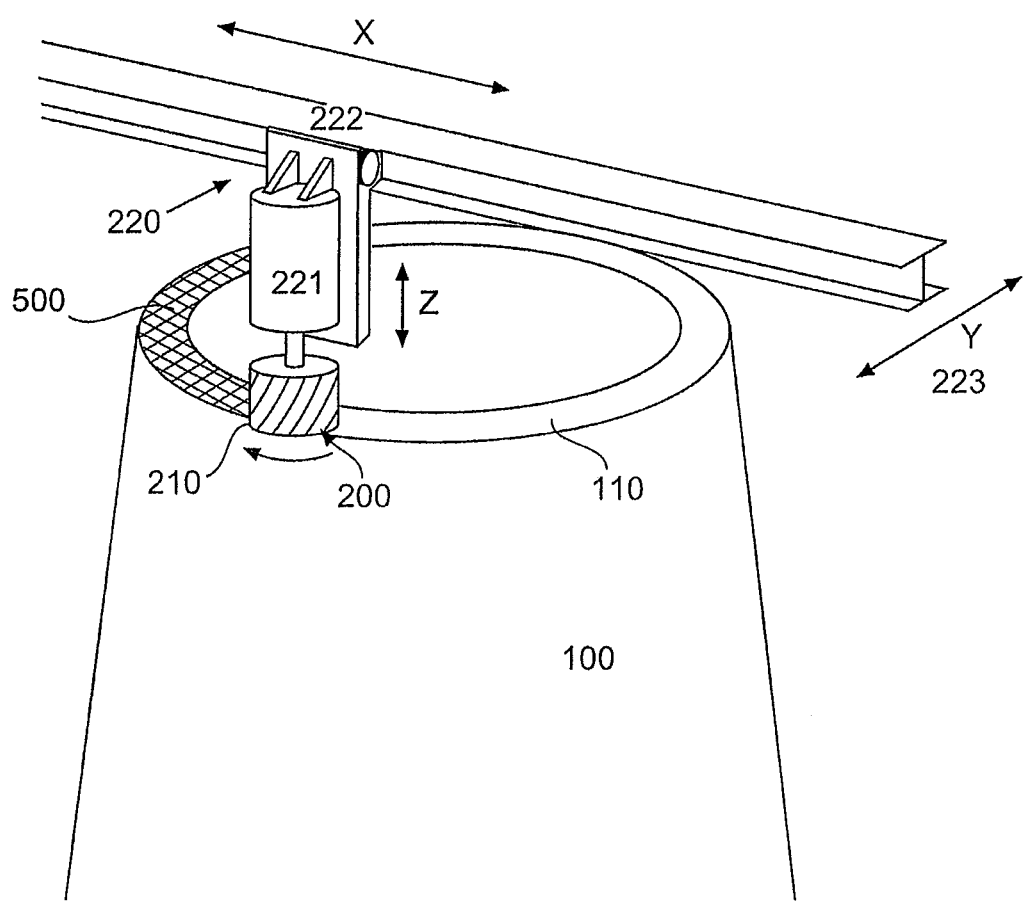
FIG. 1 shows a diagrammatic perspective view of a precast concrete part and a removal unit in a first embodiment.

FIG. 1 shows a perspective view of a precast concrete part and a removal unit in accordance with the first embodiment. The precast concrete part 100 has a join surface or a flange 110, to which an equalization layer 500 is applied. In the first embodiment the removal unit 200 is in the form of a milling unit having a milling head 210 and a displacement unit 220. The displacement unit 220 has a Z-displacement unit 221 for displacement in the Z-direction, an X-displacement unit 222 for displacement in the X-direction and a Y-displacement unit 223 for displacement in the Y-direction. The milling head 210 can be accurately controlled by the X-, Y- and Z-displacement units so that the milling head 210 can remove the equalization layer 500 on the join surface or the flange 110 of the precast concrete part 100 in that way as soon as the equalization layer has reached a minimum strength required for the mechanical processing operation so that the join surface or the flange 110 is plane-parallel.

The equalization layer is preferably synthetic resin such as for example epoxy resin and is applied to the join surface 110 of the precast concrete part 100. After the equalization layer has reached a minimum strength it is then removed in plane-parallel relationship by means of the milling unit 200. Those working steps are preferably performed in a factory under defined conditions. That can thus reproduce desired quality.

After the conclusion of the removal operation the equalization layer can be of a layer thickness of 1 to 5 millimeters.

Figure 2:
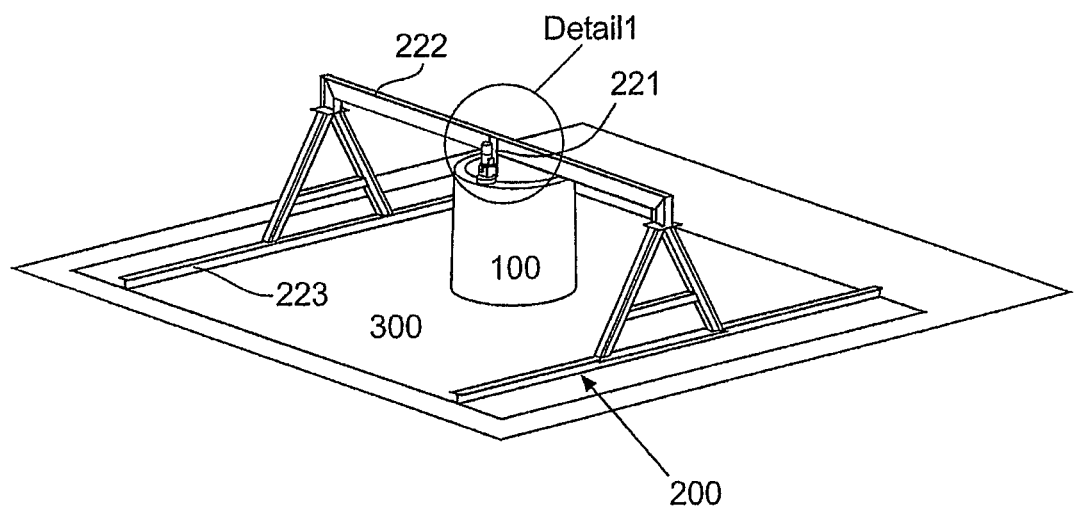
FIG. 2 shows a perspective view of a precast concrete part and a removal unit in the first embodiment.

FIG. 2 shows a perspective view of a precast concrete part and a removal unit in accordance with the first embodiment. In this case the precast concrete part 100 is standing on a floor 300 which is oriented horizontal. The removal unit or the milling unit 200 has an X-displacement unit 222, a Y-displacement unit 223 and a Z-displacement unit 221. The Y-displacement unit 223 has two rails, along which a carriage of the milling unit 200 is movable. The X-displacement unit 222 has a rail which extends between the rails of the Y-displacement unit 223 and along which the milling head 210 is movable. The milling head 210 is coupled to the Z-displacement unit 221, by which the milling cutter can be adjusted in the Z-direction, that is to say vertically.

Figure 3:
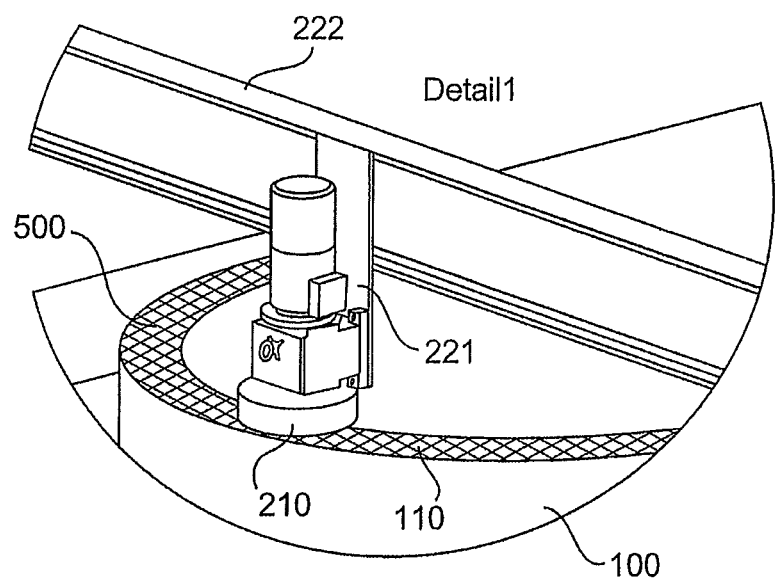
FIG. 3 shows a perspective detail view of FIG. 2.

FIG. 3 shows a perspective view of a detail portion of FIG. 2. This Figure shows the X-displacement unit 222, the Z-displacement unit 221 and the milling head 210. In this case the milling head 210 removes an equalization layer 500 to a predetermined amount. As the precast part segment is standing on a flat floor, removal of the equalization material by the milling head 210, with the Z-setting remaining the same with respect to the floor, results in a plane-parallel flange or a plane-parallel join surface which is to be found on the top side 110 of the precast concrete part 100.

Figure 4:
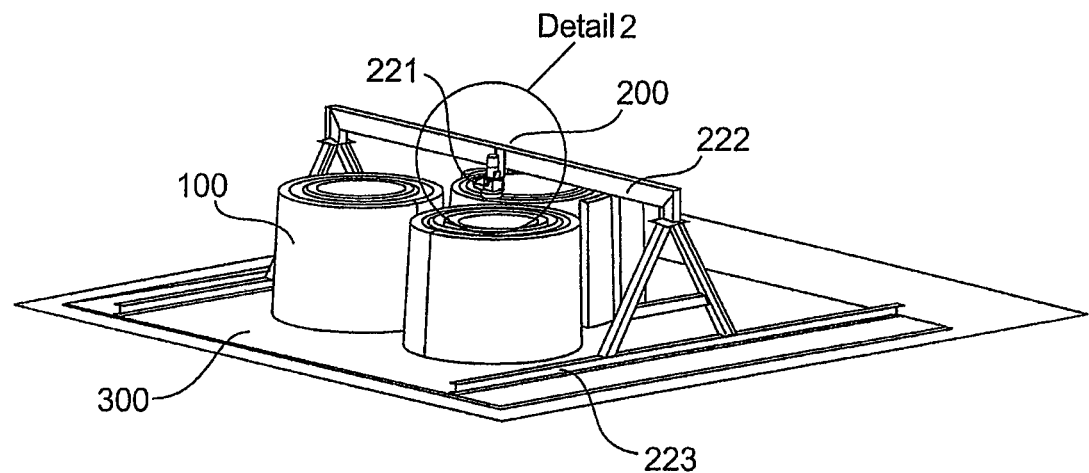
FIG. 4 shows a further perspective view of precast concrete parts and the removal unit in accordance with the first embodiment.

FIG. 4 shows a further perspective view of a plurality of precast concrete parts and a removal unit similar to the precast concrete part and removal unit shown in FIG. 2, except that FIG. 4 shows a plurality of precast concrete parts which have been placed in part one within the other. The numerals shown in FIG. 4 correspond to like numerals as shown in previous FIGS. 1-3. The plurality of precast concrete parts that are placed in part one within the other allows for a reasonable and fast removal operation. The precast concrete parts can represent complete segments or segment portions. All precast parts are processed in plane-parallel relationship at the same time by virtue of the horizontally oriented flat plane 300.

Figure 5:
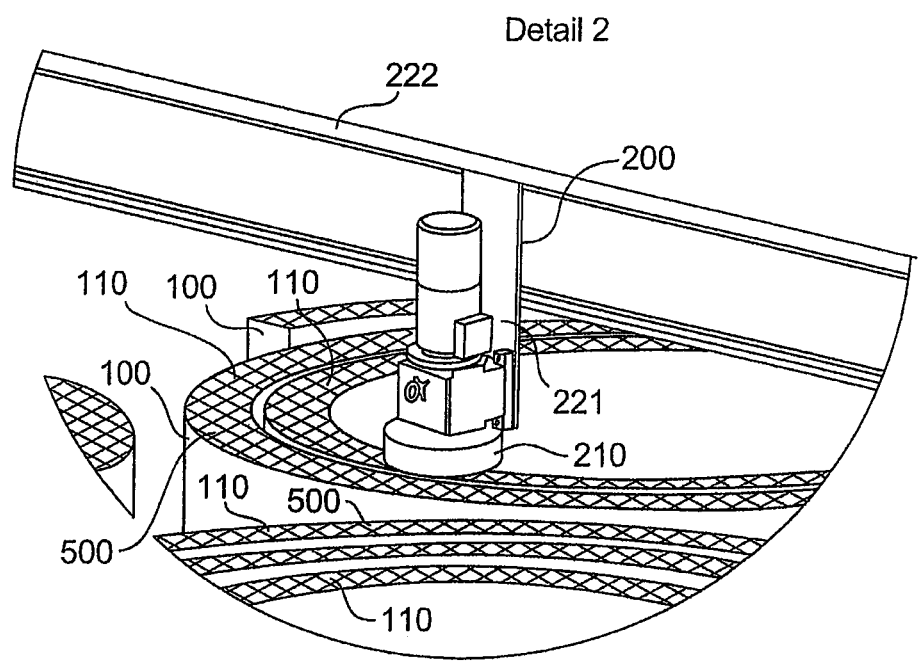
FIG. 5 shows a perspective view of a detail portion of FIG. 4.

FIG. 5 shows a perspective view of a detail in FIG. 4.

In accordance with the first embodiment of the present disclosure plane-parallel removal of the equalization layer is already effected in the factory. The casting mold in which for example the concrete is cast makes it possible that the underside is of a planar configuration. That is a preferred prerequisite for plane-parallel processing of the oppositely disposed join surface or the oppositely disposed flange.

Figure 6:
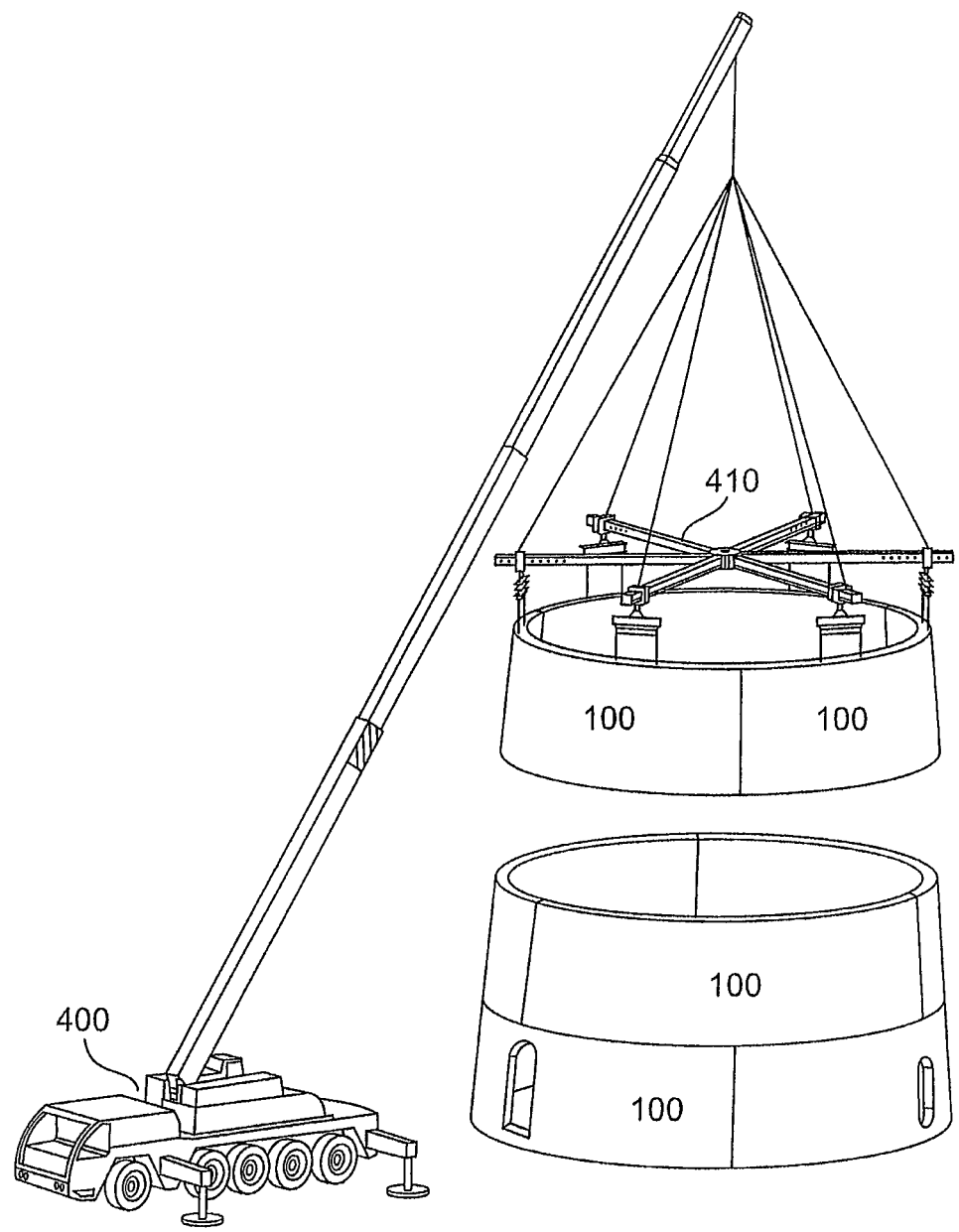
FIG. 6 shows a perspective view of a pylon in the construction phase in accordance with a second embodiment.

FIG. 6 shows a perspective view of a structure of a pylon comprising segments in accordance with the second embodiment. FIG. 6 shows a crane 400 with rigging portion 410. The crane 400 and rigging portion 410 as shown place a pylon storey portion comprising a plurality of precast concrete parts 100 on two pylon storey portions which have already been set in place and which have already been set up. In this case the precast concrete parts 100 in accordance with the second embodiment correspond to the precast concrete parts of the first embodiment.

It is thus possible to have a uniformly high quality for the precast concrete parts, wherein the bottom and the join surface or the flange of the precast concrete parts are in plane-parallel relationship with each other so that no further equalization layer has to be provided on the building site between two precast concrete parts, but the parts can be placed in a mutually fitting relationship in a mutually superposed relationship.

In a further embodiment of the present disclosure the precast parts can be lowered into the ground. For that purpose there can be provided for example a lifting platform which can be moved downwardly or which can be lowered into the ground. That is particularly advantageous because in that case no complicated and expensive X-, Y- and Z-displacement unit has to be used. In that way the displacement unit and the milling unit can be smaller. Optionally the displacement units and the milling unit can be adapted to be displaceable so that the precast parts which are to be milled or which have been milled can be placed on and removed from the lifting platform.

The invention claimed is:

1. A process for producing precast concrete pylon wall segments for a wind power installation pylon, each concrete pylon wall segment having a first end and a second end opposite the first end, the process comprising:
    casting concrete into a casting mold that has a planar floor to produce a concrete pylon wall segment having a planar underside at the first end;
    hardening the concrete to a predetermined minimum strength to obtain a precast concrete part having the predetermined minimum strength;
    applying an equalization layer to a join surface at the second end of the precast concrete pylon wall segment that is opposite to the planar underside of the precast concrete pylon wall segment at the first end;
    placing the precast concrete pylon wall segment of predetermined minimum strength on a horizontal plane; and
    removing at least a portion of the equalization layer on the second end of the concrete pylon wall segment until the second end of the concrete pylon wall segment is plane-parallel to the first end so that the first and second ends of the concrete pylon wall segment are plane-parallel to each other.

2. The process according to claim 1, wherein the equalization layer includes synthetic resin.

3. The process according to claim 1, wherein removal of the equalization layer is effected by a milling unit having a displacement unit for displacement of the milling unit.

4. The process according to claim 1 wherein a plurality of precast concrete pylon wall segments of predetermined minimum strength having a respective equalization layer on one end thereof are arranged on the horizontal plane and wherein the equalization layers are processed in plane-parallel relationship to the horizontal plane by a milling unit.

* * * * *